United States Patent
Ohara et al.

(10) Patent No.: US 8,684,402 B2
(45) Date of Patent: Apr. 1, 2014

(54) AIRBAG CONTROL APPARATUS

(75) Inventors: Daiki Ohara, Wako (JP); Kazuo Matsuda, Wako (JP); Hirohito Matsubara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 182 days.

(21) Appl. No.: 13/290,130

(22) Filed: Nov. 7, 2011

(65) Prior Publication Data

US 2012/0126519 A1    May 24, 2012

(30) Foreign Application Priority Data

Nov. 22, 2010   (JP) .................................. 2010-260518

(51) Int. Cl.
  *B60R 21/015*   (2006.01)
(52) U.S. Cl.
  USPC ............................................ 280/735; 701/45
(58) Field of Classification Search
  USPC ............. 180/273; 280/735; 701/45, 112, 113; 307/10.6
  See application file for complete search history.

(56) References Cited

U.S. PATENT DOCUMENTS

| | | | |
|---|---|---|---|
| 5,164,901 A * | 11/1992 | Blackburn et al. ............... | 701/47 |
| 5,331,211 A * | 7/1994 | Kondo et al. ................. | 307/10.1 |
| 5,501,486 A * | 3/1996 | Fujita et al. .................... | 280/735 |
| 5,802,480 A * | 9/1998 | Shiraishi .......................... | 701/45 |
| 6,356,187 B2 * | 3/2002 | Jinno et al. ..................... | 340/438 |
| 6,556,137 B1 * | 4/2003 | Oka et al. ....................... | 340/561 |
| 8,251,397 B2 * | 8/2012 | Tabe .............................. | 280/735 |
| 2007/0225882 A1 * | 9/2007 | Yamaguchi et al. ............ | 701/36 |
| 2010/0224157 A1 * | 9/2010 | Mizuno ....................... | 123/179.4 |

FOREIGN PATENT DOCUMENTS

| | | |
|---|---|---|
| JP | 06-239196 | 8/1994 |
| JP | 11-334451 | 12/1999 |
| JP | 11-342782 | 12/1999 |

OTHER PUBLICATIONS

Japanese Office Action for corresponding JP Application No. 2010-260518, Oct. 2, 2012.

* cited by examiner

*Primary Examiner* — Ruth Ilan
*Assistant Examiner* — George Spisich
(74) *Attorney, Agent, or Firm* — Ditthavong Mori & Steiner, P.C.

(57) ABSTRACT

An airbag control apparatus of a vehicle includes an occupant determination device, a deployment determination device, a storage device, an airbag controller, and a voltage variation detector. The airbag controller is configured to control deployment of an airbag based on the deployment/non-deployment information. The voltage variation detector is configured to detect a variation in a voltage of an in-vehicle battery and configured to output voltage variation information to the airbag controller. If the voltage variation information indicates that the voltage detected by the voltage variation detector varies, the airbag controller controls the airbag based on deployment/non-deployment information stored in the storage device immediately before the airbag controller receives the voltage variation information indicating that the voltage detected by voltage variation detector varies.

10 Claims, 6 Drawing Sheets

AIRBAG CONTROL APPARATUS

CROSS-REFERENCE TO RELATED APPLICATIONS

The present application claims priority under 35 U.S.C. §119 to Japanese Patent Application No. 2010-260518 filed Nov. 22, 2010, entitled "Airbag control apparatus." The contents of this application are incorporated herein by reference in their entirety.

BACKGROUND OF THE INVENTION

1. Field of the Invention

The present invention relates to an airbag control apparatus.

2. Discussion of the Background

An occupant detecting apparatus in which a plurality of antenna electrodes are disposed in the middle and the side of a seat back of a vehicle in order to detect that a small person sitting in a passenger seat sleeps and leans toward the door has been developed (refer to, for example, Japanese Unexamined Patent Application Publication No. 11-334451). Even when deployment of a side airbag is needed, an airbag control apparatus of the vehicle that receives the result of detection from the occupant detecting apparatus inhibits the deployment of a side airbag if the posture of an occupant is not appropriate for safe protection (e.g., if a small person sleeps and leans toward the door).

SUMMARY OF THE INVENTION

According to one aspect of the present invention, an airbag control apparatus of a vehicle comprises an occupant determination device, a deployment determination device, a storage device, an airbag controller, and a voltage variation detector. The occupant determination device is configured to detect an occupant sitting on a seat in the vehicle. The deployment determination device is configured to determine deployment/non-deployment of an airbag based on a detection result of the occupant determination device. The deployment determination device is configured to output a result of determination including one of deployment information and non-deployment information. The storage device is configured to store deployment/non-deployment information made by the deployment determination device. The deployment/non-deployment information includes one of the deployment information and the non-deployment information. The airbag controller is configured to control deployment of the airbag based on the deployment/non-deployment information. The voltage variation detector is configured to detect a variation in a voltage of an in-vehicle battery and configured to output voltage variation information to the airbag controller. The in-vehicle battery is configured to supply power to the deployment determination device. If the voltage variation information indicates that the voltage detected by the voltage variation detector varies, the airbag controller controls the airbag based on the deployment/non-deployment information stored in the storage device immediately before the airbag controller receives the voltage variation information indicating that the voltage detected by voltage variation detector varies. If the voltage variation information indicates that the voltage detected by voltage variation detector varies, the airbag controller maintains one of a deployment control and a non-deployment control of the airbag until the deployment/non-deployment information is re-input from the deployment determination device to the airbag controller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

According to an embodiment of the present invention, an airbag control apparatus for use in a vehicle including an idle stop control unit (e.g., an idle stop control unit 40 according to an exemplary embodiment) that restarts an engine if an automatic restart condition is satisfied when the engine is stopped is provided. The airbag control apparatus includes a on-seat state determination unit configured to detect a status of an occupant sitting on a seat of the vehicle (e.g., a seat 10 according to the exemplary embodiment), a deployment determination unit (e.g., a deployment determination unit 31 according to the exemplary embodiment) configured to determine deployment/non-deployment of an airbag (e.g., an airbag 43 according to the exemplary embodiment) on the basis of a result of determination made by the on-seat state determination unit and output the result of determination in the form of one of deployment information and non-deployment information, a storage unit (e.g., a memory 33 according to the exemplary embodiment) configured to store the result of determination made by the deployment determination unit in the form of one of deployment information and non-deployment information, an airbag control unit (e.g., an airbag control unit 32 according to the exemplary embodiment) configured to control deployment of the airbag on the basis of at least the deployment information or non-deployment information, and a voltage variation detection unit (e.g., a voltage variation detection unit 24 according to the exemplary embodiment) configured to detect a voltage of an in-vehicle battery (e.g., a battery B according to the exemplary embodiment) for driving the deployment determination unit, detect a variation in the voltage, and output voltage variation information to the airbag control unit. Upon receiving the voltage variation information, the airbag control unit performs one of deployment control and non-deployment control of the airbag on the basis of the deployment/non-deployment information stored in the storage unit immediately before the voltage variation information is received and maintains the deployment control or the non-deployment control of the airbag until deployment/non-deployment information is re-input from the deployment determination unit. According to the embodiment of the present invention, when the engine is cranked and restarted from an idle stop mode and if a voltage variation is detected, the deployment/non-deployment of the airbag is controlled on the basis of one of the deployment information and the non-deployment information stored in the storage unit before the voltage variation occurs. Accordingly, even when the data detected by the on-seat state determination unit cannot be retrieved due to the voltage variation, the airbag control unit performs deployment/non-deployment control of the airbag on the basis of the deployment information or the non-deployment information stored in the storage unit stored immediately before the voltage variation. Thus, for example, when the airbag should not be deployed, deployment of the airbag occurring due to an uncertain occupant status caused by the voltage variation can be prevented. As a result, even immediately after the engine is restarted after resuming from an idle stop mode, deployment/non-deployment control of the airbag can be appropriately performed.

When a variation in the voltage detected by the voltage variation detection unit disappears, the deployment determination unit can output one of the deployment information and non-deployment information indicating deployment/non-deployment of the airbag on the basis of the result of determination made by the on-seat state determination unit to the airbag control unit. When a variation in the voltage detected by the voltage variation detection unit disappears, the airbag control unit can overwrite one of the deployment information and the non-deployment information input from the deployment determination unit on a previous one of deployment information and non-deployment information stored in the storage unit. In this way, in addition to the above-described advantage, when the voltage variation disappears and, therefore, the result of detection made by the on-seat state determination unit can be retrieved, deployment/non-deployment control of the airbag can be resumed by the airbag control unit on the basis of one of the deployment information and the non-deployment information that are the results of determination made by the deployment determination unit. Accordingly, if the type or the state of an occupant is changed after the voltage variation has disappeared, deployment/non-deployment control of the airbag appropriate for the type and the state of the occupant can be advantageously performed. In addition, when the voltage variation disappears, a process of overwriting the latest deployment information or non-deployment information on the deployment information or the non-deployment information stored in the storage unit is resumed. Accordingly, if a voltage variation occurs again, deployment/non-deployment control of the airbag can be performed by the airbag control unit on the basis of one of the deployment information and the non-deployment information stored in the storage unit.

The embodiments will now be described with reference to the accompanying drawings, wherein like reference numerals designate corresponding or identical elements throughout the various drawings.

Figure 1:
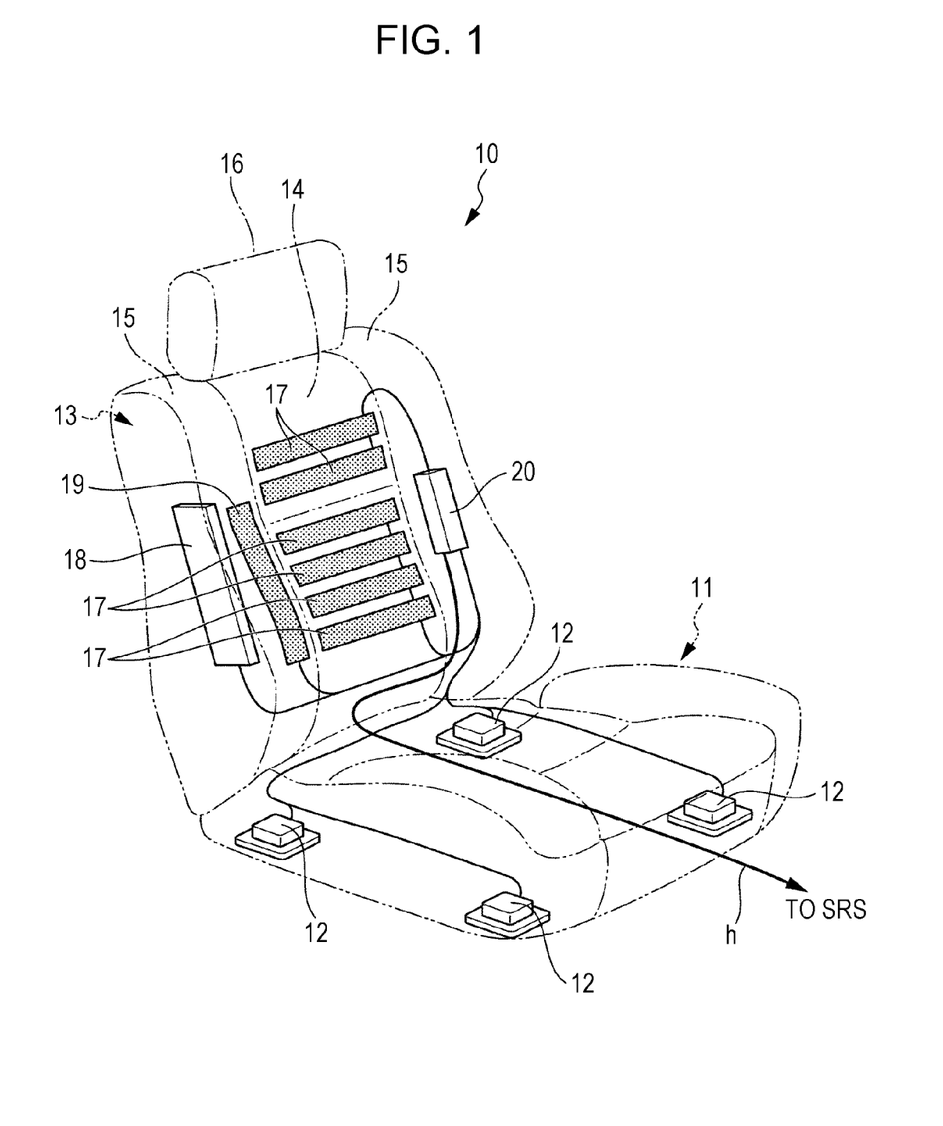
FIG. 1 is a perspective view of a seat according to an exemplary embodiment of the present invention.

An airbag control apparatus 1 according to an exemplary embodiment of the present invention is described below with reference to the accompanying drawings. FIG. 1 illustrates a seat 10 for which an occupant is detected by the airbag control apparatus 1 according to the exemplary embodiment. The seat 10 is disposed on the right hand side of the cabin of a vehicle facing forward (i.e., a seat known as a "passenger seat"). Note that the exemplary embodiment is described with reference to a passenger seat of a vehicle having a steering wheel on the left hand side facing forward. However, the same can apply to a vehicle having a steering wheel on the right hand side in the traveling direction by replacing the word "right" with the word "left" and replacing the word "left" with the word "right" in the following description.

As illustrated in FIG. 1, the seat 10 includes a seat cushion unit 11 attached thereto in a slidable manner in the front-rear direction of the vehicle on a seat rail mounted on a floor panel (not shown). A weight sensor 12 is attached to each of the four corners of the seat cushion unit 11. The weight sensor 12 can detect a weight applied downward to the seat surface. The detection result of each of the weight sensors 12 is input to an occupant detecting unit 20.

The seat cushion unit 11 includes a seat back unit 13 attached thereto in a tiltable manner. The seat back unit 13 includes a center back portion 14 having a constant width in the middle in the right-left direction. The seat back unit 13 further includes right and left side back portions 15 that slightly bulge forward from both sides of the center back portion 14 in the right-left direction. A head rest 16 is attached to the upper edge of the center back portion 14 of the seat back unit 13. In order to detect the sitting height of the occupant sitting in the seat, a plurality of belt antenna electrodes 17 are incorporated into the center back portion 14 on the front surface side so as to be arranged along the width direction of the vehicle. When the belt antenna electrodes 17 generate weak electric fields, capacitive coupling between the occupant and each of the antenna electrodes 17 varies with the sitting height of the occupant located in close proximity to the antenna electrode 17. Thus, by detecting an electric current that varies with the variation in the capacitive coupling, the sitting height of the occupant can be detected. The antenna electrodes 17 are connected to the occupant detecting unit 20.

An edge portion of the seat back unit 13 disposed on the outer side in the width direction of the vehicle, that is, the end edge portion adjacent to a side door is bulged forward, and a side airbag module 18 that inflates a side airbag between the occupant sitting in the seat 10 and the side door is disposed in the seat back unit 13 at a predetermined height. In addition, one of the right and left side back portions 15 of the seat back unit 13 located on the outer side in the width direction of the vehicle includes an antenna electrode 19 that primarily detects the head of the occupant. The antenna electrode 19 has a belt shape that vertically extends. The antenna electrode 19 is disposed so that the height of the antenna electrode 19 is aligned with the height of the side airbag when inflated. Like the antenna electrodes 17, the antenna electrode 19 detects the head of an occupant by detecting a variation in capacitive coupling.

Figure 2:
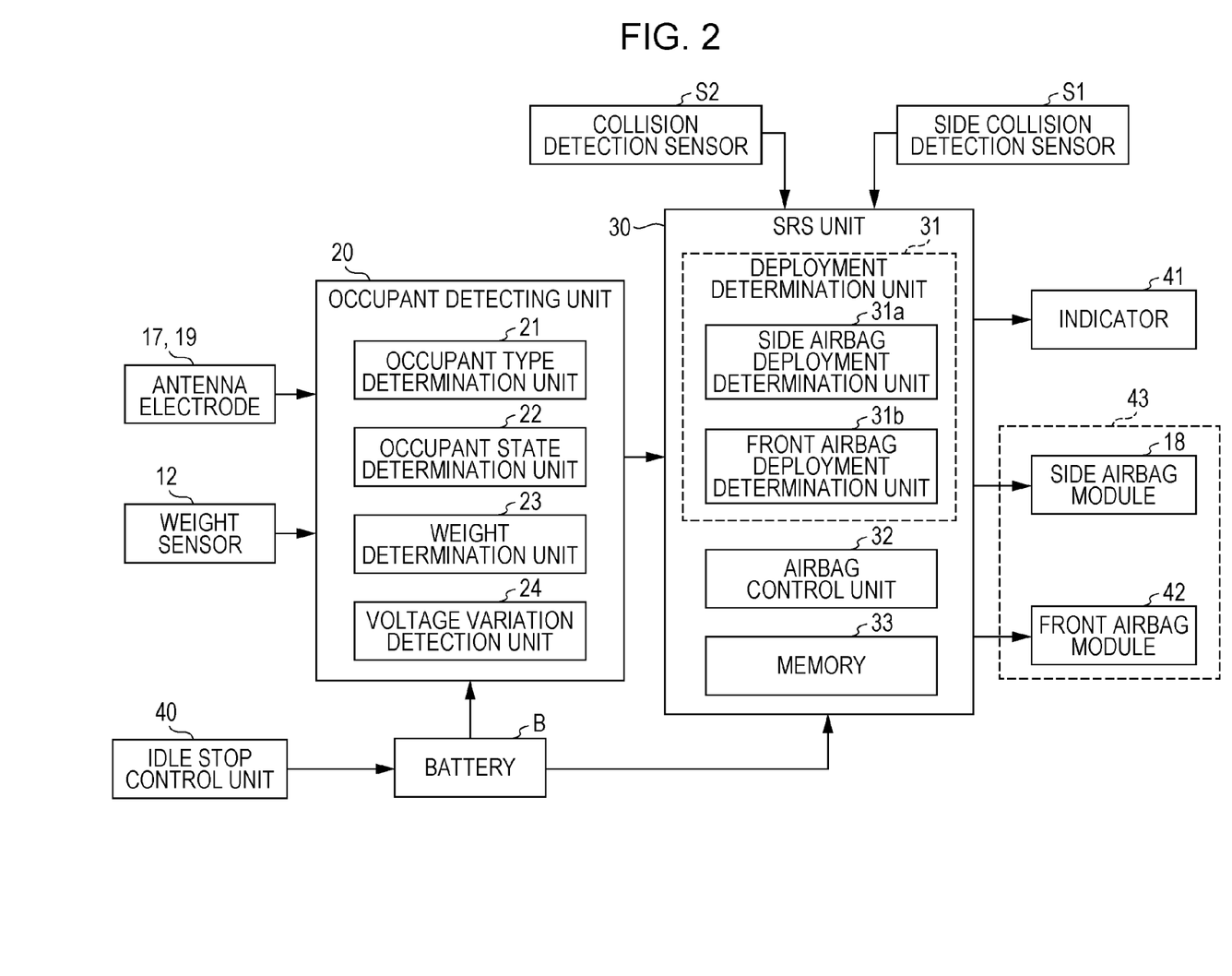
FIG. 2 is a block diagram of an exemplary configuration of an airbag control apparatus according to the exemplary embodiment of the present invention.

The occupant detecting unit 20 is incorporated into the other side back portion 15 located on the side opposite to the side on which the side airbag module 18 is disposed. As illustrated in FIG. 2, the occupant detecting unit 20 includes an occupant type determination unit 21, an occupant state determination unit 22, and a weight determination unit 23, and a voltage variation detection unit 24.

The occupant type determination unit 21 generates a weak electric field having a predetermined frequency in the above-described antenna electrodes 17 and detects the sitting height of an occupant on the basis of a circuit current thereof. In this way, the occupant type determination unit 21 determines the presence/absence of a child seat mounted in the seat and the type of occupant (a small person or not) on the basis of the sitting height information regarding the occupant and the weight information output from the weight sensor 12. For example, when the sitting height detected using the antenna electrodes 17 is smaller than a predetermined sitting height threshold value set for detecting a small person and if the weight detected using the weight sensor 12 is smaller than a predetermined weight threshold value set for detecting a small person, the occupant type determination unit 21 determines that the occupant is a small person.

If the occupant state determination unit 22 generates a weak electric field having a predetermined frequency in the antenna electrode 19 in the side back portion 15 and detects that an occupant is in close proximity to the antenna electrode 19 on the basis of a circuit current thereof, the occupant state determination unit 22 determines that the occupant sitting in the seat leans toward the side door. Thereafter, type information and the state information regarding the occupant, which are the results of determination made by the occupant type determination unit 21 and the occupant state determination unit 22, are output to a deployment determination unit 31 at predefined intervals.

The weight determination unit 23 determines whether an occupant is sitting in the seat and whether a child seat is mounted on the seat on the basis of the result of detection performed by the weight sensor 12. If a weight that is larger than a predetermined weight is detected, the weight determination unit 23 determines that an occupant is sitting in the seat. In addition, if the detected weight is larger than a predetermined weight used for determining the presence/absence of a child seat and is smaller than a predetermined weight for determining the presence of a sitting occupant, the weight determination unit 23 determines that a child seat is mounted. Thereafter, occupant presence/absence information and child seat presence/absence information, which are the results of determination made by the weight determination unit 23, are output to a deployment determination unit 31 with a predetermined period. Note that an on-seat state determination unit is formed by the occupant type determination unit 21, the occupant state determination unit 22, and the weight determination unit 23.

In order to detect a mode in which data detected by the antenna electrodes 17, the antenna electrode 19, and the weight sensors 12 cannot be retrieved, the voltage variation detection unit 24 monitors the battery voltage of a battery B mounted in the vehicle and serving as an electric power supply for driving the occupant detecting unit 20. The voltage variation detection unit 24 detects a variation in the voltage when the voltage is decreased to such a value that the results of detection performed by the antenna electrodes 17, the antenna electrode 19, and the weight sensors 12 cannot be retrieved (e.g., about 10 V in the case of a 12-V battery). Thereafter, the voltage variation detection unit 24 outputs voltage variation information to an SRS unit 30.

In this exemplary embodiment, the vehicle includes an idle stop control unit 40. If an automatic stop condition is satisfied when, for example, the vehicle stops, the idle stop control unit 40 stops the engine, that is, the idle stop control unit 40 performs idle stop control. In addition, if an automatic engine start condition is satisfied when the engine stops, the idle stop control unit 40 performs restart control in which the engine is cranked. When the engine is cranked, the battery voltage is decreased to such a level that normal detection results output from the antenna electrodes 17, the antenna electrode 19, and the weight sensors 12 cannot be retrieved. However, the battery voltage is not decreased to such a level that all of the operations performed by the occupant detecting unit 20 stop (e.g., about 6 V).

That is, even when the battery voltage is decreased to such a level that normal detection results output from the antenna electrodes 17, the antenna electrode 19, and the weight sensors 12 cannot be retrieved, control operations performed by a communication unit (not shown) that outputs the voltage variation information and the voltage variation detection unit 24 can be performed as long as the battery voltage is higher than such a level that the occupant detecting unit 20 stops the operation thereof. Note that while the above description has been made with reference to a case in which a variation in the voltage of the battery B is caused by cranking the engine, the case in which a variation in the voltage of the battery B occurs is not limited thereto. The same can apply to, for example, the case in which a variation in the voltage is caused by an increase in the load of another unit that uses the battery B as a power supply.

The SRS unit 30 includes the deployment determination unit 31, an airbag control unit 32, and a memory 33. The following units are connected to the SRS unit 30: the above-described occupant detecting unit 20, a front airbag module 42, the side airbag module 18, a side collision detection sensor S1 for detecting side collision against the seat 10 from the outside in the width direction of the vehicle, a collision detection sensor S2 for primarily detecting collision against the front and rear portions of the vehicle, and an indicator 41 for displaying information for a driver. In general, in order to eliminate an adverse effect of a voltage variation of the power supply, the SRS unit 30 includes a power supply backup device. Note that the front airbag module 42 is a widely used airbag module disposed in the vehicle in front of the seat 10. In order to discriminate the front airbag module 42 from the side airbag module 18, the word "front" is used. In addition, an airbag 43 is formed from the side airbag module 18 and the front airbag module 42.

The deployment determination unit 31 includes a side airbag deployment determination unit 31a that determines whether the side airbag is to be deployed and a front airbag deployment determination unit 31b that determines whether the front airbag is to be deployed.

Figure 4:
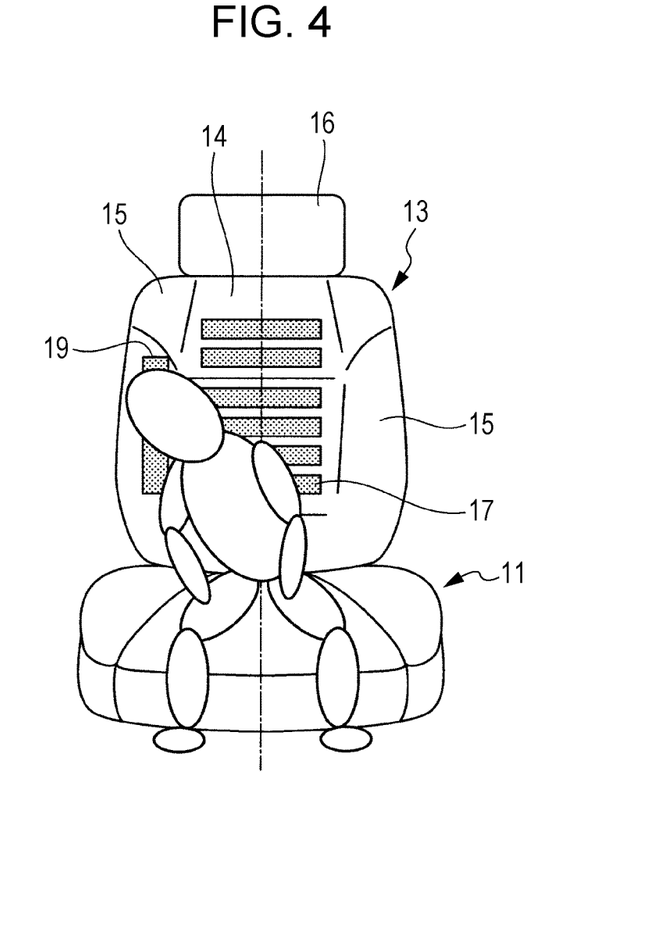
FIG. 4 illustrates a small person leaning toward a door according to the exemplary embodiment of the present invention.

The side airbag deployment determination unit 31a stores the occupant type information output from the occupant type determination unit 21 and the occupant state information output from the occupant state determination unit 22 in a temporary storage unit and determines whether a side airbag deployment inhibiting condition is satisfied on the basis of the occupant type information and the occupant state information stored in the temporary storage unit. More specifically, when the occupant type information indicates a "small person" and if the occupant state information indicates "leaning towards the door", it is highly likely that, as shown in FIG. 4, the head of a small person is located at a position at which the side airbag is deployed. Accordingly, the side airbag deployment determination unit 31a determines that the side airbag deployment inhibiting condition is satisfied and outputs side airbag non-deployment information (non-deployment information) for inhibiting deployment of the side airbag module 18 to the airbag control unit 32. However, if the side airbag deployment inhibiting condition is not satisfied, the side airbag deployment determination unit 31a outputs side airbag deployment information (deployment information) for allowing deployment of the side airbag module 18 to the airbag control unit 32.

The front airbag deployment determination unit 31b stores the occupant presence/absence information and the child seat presence/absence information input from the weight determination unit 23 in a temporary storage unit (not shown) and determines whether an airbag deployment inhibiting condition for the front airbag module 42 is satisfied on the basis of the occupant presence/absence information and the child seat presence/absence information stored in the temporary storage unit. More specifically, if the occupant presence/absence information indicates "no sitting occupant" or if the child seat presence/absence information indicates "child seat mounted", the front airbag deployment determination unit 31b determines that the front airbag deployment inhibiting condition is satisfied and outputs front airbag non-deployment information (non-deployment information) for inhibiting deployment of the front airbag module 42 to the airbag control unit 32. However, if the front airbag deployment inhibiting condition is not satisfied, the front airbag deployment determination unit 31b outputs front airbag deployment information (deployment information) for allowing deployment of the front airbag module 42 to the airbag control unit 32.

If a side collision load that is higher than an airbag deployment threshold value is detected by the side collision detection sensor S1, the airbag control unit 32 sets a side airbag control status on the basis of one of the side airbag deployment information and the side airbag non-deployment information input from the side airbag deployment determination unit 31a and performs deployment control or non-deployment control for the side airbag module 18 in accordance with the side airbag control status.

In addition, if a collision load that is higher than an airbag deployment threshold value is detected by the collision detection sensor S2, the airbag control unit 32 sets a front airbag control status on the basis of one of the front airbag deployment information and the front airbag non-deployment information input from the front airbag deployment determination unit 31b and performs deployment control or non-deployment control for the front airbag module 42 in accordance with the front airbag control status.

If, for example, the side airbag non-deployment information is input, the airbag control unit 32 sets the side airbag control status to "non-deployment". However, if the side airbag deployment information is input, the airbag control unit 32 sets the side airbag control status to "deployment". Note that the front airbag control status of the front airbag module 42 is set in the same manner as for the side airbag control status of the side airbag module 18.

The memory 33 serves as a nonvolatile storage unit for storing one of the side airbag deployment information and the side airbag non-deployment information and further storing one of the front airbag deployment information and the front airbag non-deployment information. If new side airbag deployment information or new side airbag non-deployment information is input to the airbag control unit 32 or if new front airbag deployment information or new front airbag non-deployment information is input to the airbag control unit 32, the old side airbag deployment information or the old side airbag non-deployment information is overwritten with the new side airbag deployment information or the new side airbag non-deployment information, or the front airbag deployment information or the old front airbag non-deployment information is overwritten with the new front airbag deployment information or the new front airbag non-deployment information in the memory 33.

Note that if the voltage variation information is input from the occupant detecting unit 20, the airbag control unit 32 sets the side airbag control status on the basis of one of the side airbag deployment information and the side airbag non-deployment information stored in the memory 33 during a period of time until one of new side airbag deployment information and new side airbag non-deployment information and one of new front airbag deployment information and new front airbag non-deployment information are input from the deployment determination unit 31. In addition, the airbag control unit 32 sets the front airbag control status on the basis of one of the front airbag deployment information and the front airbag non-deployment information stored in the memory 33. That is, if there is a possibility of wrong determination of the states of the seat 10 (i.e., the presence/absence of a occupant in the seat, the presence/absence of a mounted child seat, the type of occupant, and the occupant state) due to the occurrence of a voltage variation, the airbag control unit 32 sets the side airbag control status and the front airbag control status using one of the side airbag deployment information and the side airbag non-deployment information and one of the front airbag deployment information and the front airbag non-deployment information stored in the memory 33 immediately before the voltage variation occurs. In this way, the side airbag control status and the front airbag control status obtained immediately before the voltage variation occurs can be maintained.

Figure 3:
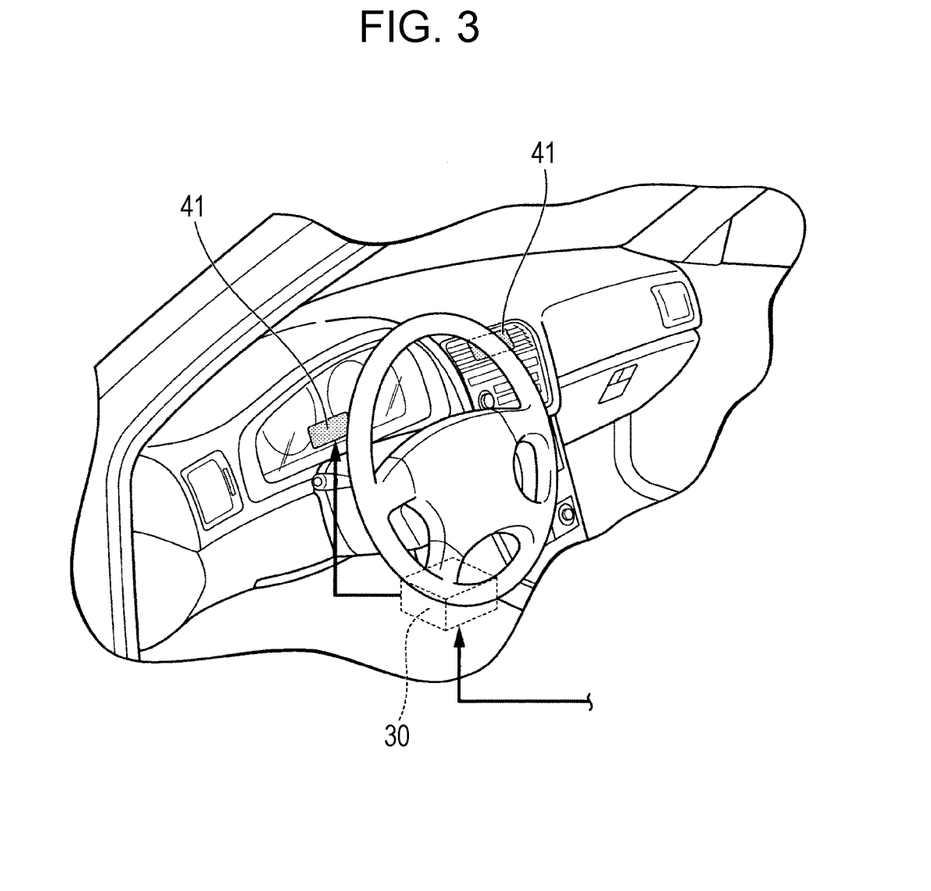
FIG. 3 is a perspective view of the front section of a vehicle cabin according to the exemplary embodiment of the present invention.

As illustrated in FIG. 3, the SRS unit 30 controls illumination of the indicator 41 disposed on a meter panel or a center console on the basis of the side airbag control status set to "deployment" or "non-deployment" by the airbag control unit 32. Thus, the SRS unit 30 informs the occupant of the side airbag being in a non-deployment state and the front airbag being in a non-deployment state.

According to the present exemplary embodiment, the airbag control apparatus 1 has the above-described configuration. An exemplary operation performed by the airbag control apparatus 1 is described next with reference to the accompanying drawings. Note that in the description of the exemplary operation below, only deployment/non-deployment of the side airbag module 18 is described, and description of deployment/non-deployment of the front airbag module 42 is not provided.

Figure 5:
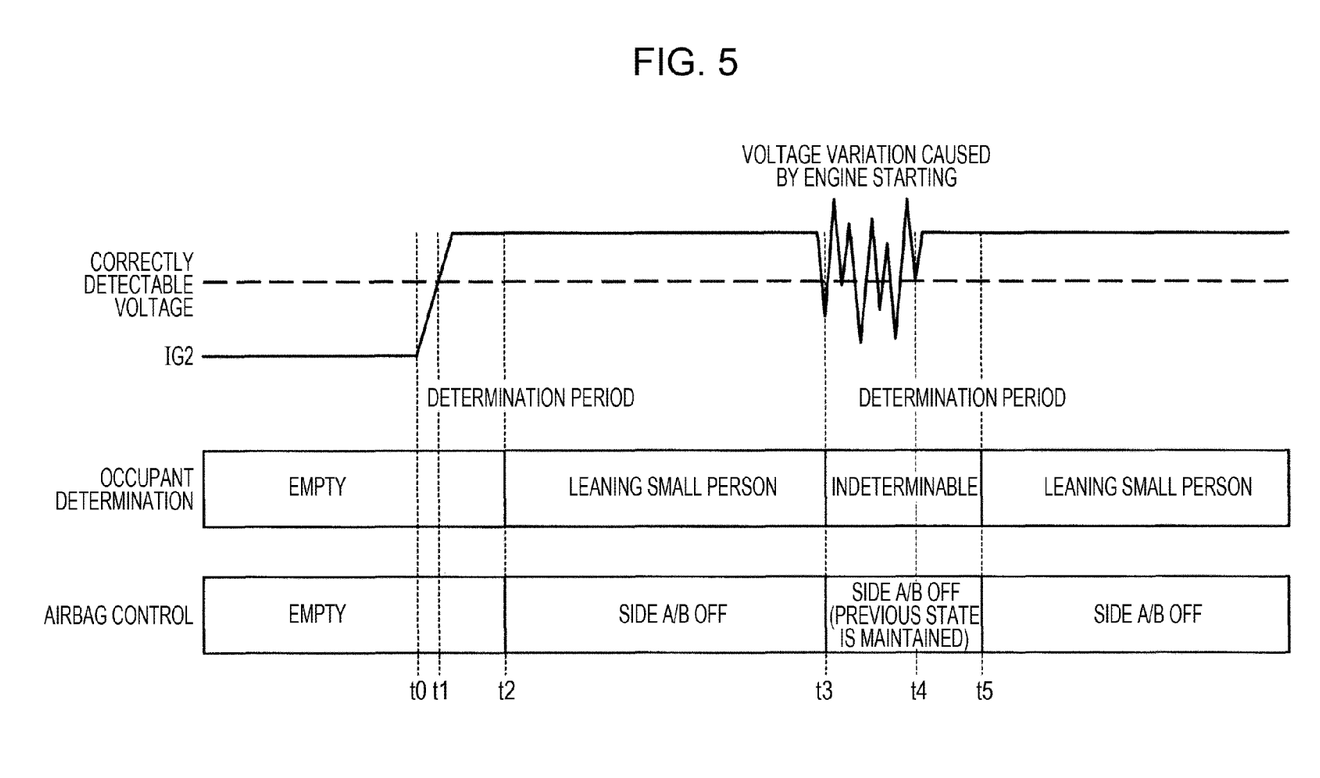
FIG. 5 is a timing diagram illustrating the operation of the airbag control apparatus according to the exemplary embodiment of the present invention.

As illustrated in FIG. 5, when an occupant gets in a vehicle and an ignition key is turns on at a time t0, a battery voltage (IG2) applied to the occupant detecting unit 20 continuously rises. When, at a time t1, the battery voltage reaches a voltage value that allows correct determination on the basis of the results of detection performed by the antenna electrodes 17, the antenna electrode 19, and the weight sensors 12, determination of the occupant type made by the occupant type determination unit 21 and determination of an occupant state made by the occupant state determination unit 22 are started. Note that before the determination is started, the result of determination made by the occupant detecting unit 20 and the side airbag control status (deployment/non-deployment) set by the airbag control unit 32 are set to null (EMPTY).

If, at a time t2, the determination of the occupant type and the occupant state is completed and, for example, it is determined that a small person leaning toward the door is present ("Learning Small Person"), the side airbag deployment determination unit 31a determines that the side airbag deployment inhibiting condition is satisfied. Thus, side airbag non-deployment information is output to the airbag control unit 32. As a result, the airbag control unit 32 sets the side airbag control status to "non-deployment" (Side A/B OFF). However, if the side airbag deployment determination unit 31a determines that the side airbag deployment inhibiting condition is not satisfied, the side airbag deployment information indicating that deployment of the side airbag is allowed is output to the airbag control unit 32. Thereafter, determination of the state of the seat 10 is repeated at predetermined intervals, and it is determined whether the side airbag deployment inhibiting condition is satisfied.

Subsequently, the idle stop control unit 40 automatically stops the engine. At a time t3, in order to restart the engine, the engine is cranked. When the battery voltage oscillates and if the voltage drops below a predetermined voltage, the voltage variation detection unit 24 detects the voltage variation. At that time, the voltage variation information is output to the airbag control unit 32. If the data detected by the antenna electrodes 17 and the antenna electrode 19 cannot be retrieved, the result of determination in terms of the occupant type and the occupant state, which are used for determination of deployment made by the side airbag deployment determination unit 31a, becomes indeterminable.

When the voltage variation information is input to the airbag control unit 32, the side airbag deployment information or the side airbag non-deployment information stored in the memory 33 immediately before the time t3 at which a voltage variation occurred is read out. The side airbag control status is set to "deployment" or "non-deployment" on the basis of the readout side airbag deployment information or side airbag non-deployment information. In addition, at the time t3, determination made by the side airbag deployment determination unit 31a is stopped, or output of the result of determination is stopped.

That is, in the case illustrated in FIG. 5, since the side airbag deployment inhibiting condition is satisfied at a point in time immediately before the time t3, the side airbag control status is set to "non-deployment" after the time t3 (Side A/B OFF). Thus, the airbag control unit 32 performs non-deployment control of the side airbag module 18.

Thereafter, if, at a time t4, the voltage variation disappears, the detection data can be retrieved from the antenna electrodes 17 and the antenna electrode 19. If such a state continues for a predetermined period of time, determination made by the occupant type determination unit 21 and the occupant state determination unit 22 is started. Furthermore, at a time t5, the results of determination made by the resumed occupant type determination unit 21 and the occupant state determination unit 22 are input to the side airbag deployment determination unit 31a. Accordingly, determination as to whether the side airbag deployment inhibiting condition is satisfied is resumed, and output of one of the side airbag deployment information and the side airbag non-deployment information to the airbag control unit 32 is resumed.

At that time, the airbag control unit 32 stops setting the side airbag control status on the basis of the information stored in the memory 33 and overwrites one of the new input side airbag deployment information and side airbag non-deployment information on the information stored in the memory 33. As in the case in which the voltage variation occurs, the airbag control unit 32 sets the side airbag control status on the basis of one of the side airbag deployment information and the side airbag non-deployment information input from the deployment determination unit 31 and performs deployment/non-deployment control of the side airbag module 18. That is, in the airbag control unit 32, only during a period of time from when a variation in the voltage of the battery B is detected to when one of the side airbag deployment information and the side airbag non-deployment information is re-input from the side airbag deployment determination unit 31a, control of the side airbag module 18 is performed on the basis of one of the side airbag deployment information and the side airbag non-deployment information stored in the memory 33.

Figure 6:
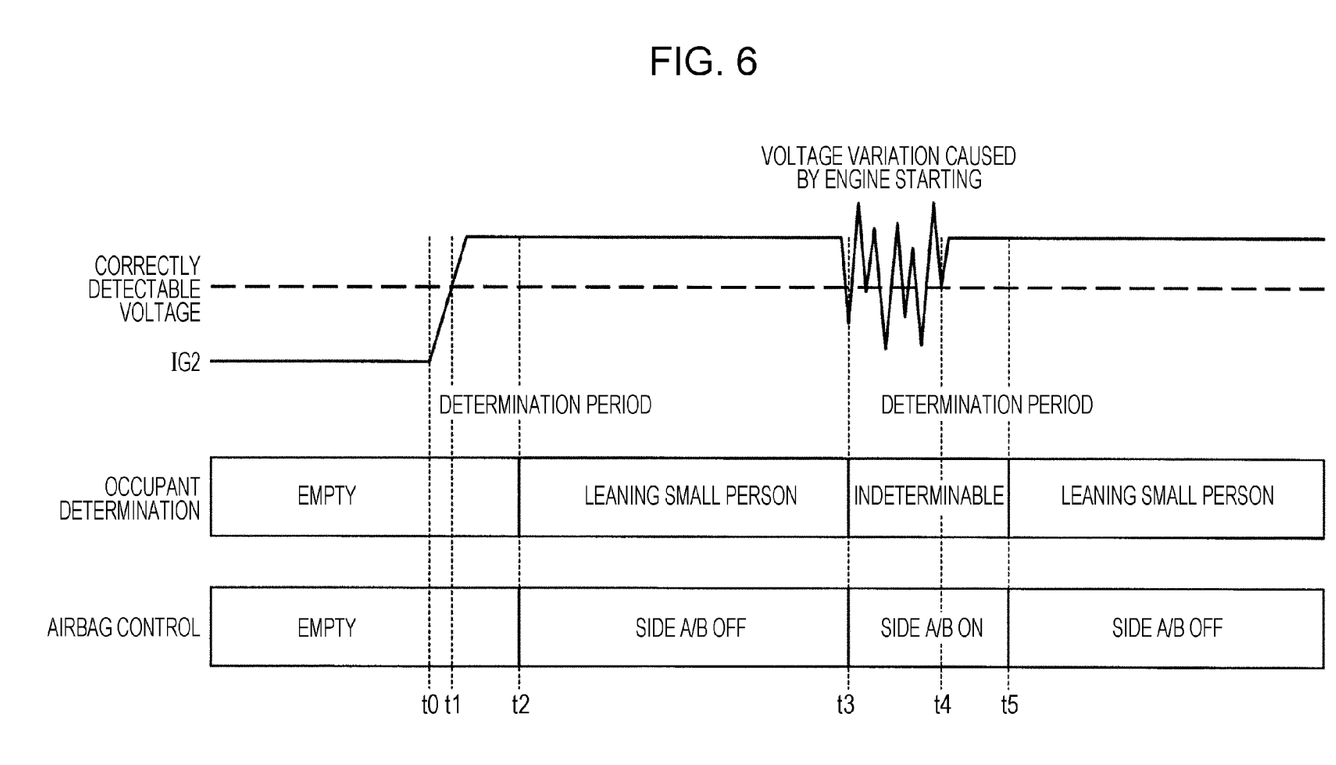
FIG. 6 is a timing diagram for an existing airbag control apparatus corresponding to the timing diagram illustrated in FIG. 5.

FIG. 6 is an example of a timing diagram for an existing apparatus. In this case, if the results of determination made by a occupant detection unit become indeterminable for the period of time from t3 to t5, the side airbag deployment inhibiting condition may not be satisfied and, therefore, the side airbag control status may be set to "deployment" (Side A/B ON). In such a case, even when the type of occupant and the occupant state satisfy the deployment inhibiting condition, the side airbag is deployed.

Note that while the above description has been made with reference to an example of deployment/non-deployment control of the side airbag module 18 in the case where a voltage variation occurs, deployment/non-deployment control of the front airbag module 42 can be performed in the same manner. Thus, the deployment/non-deployment control of the side airbag module 18 and the deployment/non-deployment control of the front airbag module 42 are performed in parallel.

Therefore, according to the present exemplary embodiment, when the engine is cranked and restarted from the idle stop mode and if the voltage variation detection unit 24 detects a voltage variation, the side airbag control status is set on the basis of one of the side airbag deployment information and the side airbag non-deployment information stored in the memory 33. In addition, the front airbag control status is set on the basis of one of the front airbag deployment information and the front airbag non-deployment information stored in the memory 33. Accordingly, even when the data detected by the weight sensors 12, the antenna electrodes 17, and the antenna electrode 19 cannot be retrieved due to the voltage variation, the side airbag control status can be set on the basis of one of the side airbag deployment information and the side airbag non-deployment information stored in the memory 33 immediately before the voltage variation occurred, and the front airbag control status can be set on the basis of one of the front airbag deployment information and the front airbag non-deployment information stored in the memory 33 immediately before the voltage variation occurred. Thereafter, deployment/non-deployment control of the side airbag module 18 and the front airbag module 42 can be performed. Therefore, deployment of the side airbag and the front airbag can be reliably prevented. As a result, even at a time immediately after resuming from an idle stop mode, appropriate deployment/non-deployment control of the airbag 43 can be performed.

In addition, when a voltage variation disappears and, therefore, the results of detection performed by the weight sensors 12, the antenna electrodes 17, and the antenna electrode 19 can be retrieved, the deployment/non-deployment control of the side airbag module 18 and the front airbag module 42 performed by the airbag control unit 32 can be resumed on the basis of one of the side airbag deployment information and the side airbag non-deployment information and one of the front airbag deployment information and the front airbag non-deployment information determined by the deployment determination unit 31. Thus, if the state of the seat 10, such as the type of occupant or the state of the occupant, is changed after the voltage variation disappears, deployment/non-deployment control of the side airbag module 18 and the front airbag module 42 that is optimum for the state of the seat 10 can be performed.

It should be noted that the present invention is not limited to the configuration of the above-described exemplary embodiment, but modifications of the design may be made within the spirit and scope of the invention. For example, while the above exemplary embodiment has been described with reference to the case in which the voltage variation detection unit 24 is provided in the occupant detecting unit 20, the voltage variation detection unit 24 may be provided in the SRS unit 30. In addition, while the above embodiment has been described with reference to the case in which the presence/absence of an occupant sitting in the seat and the presence/absence of a child seat is determined on the basis of the results of detection performed by the weight sensors 12, the sensor is not limited to the weight sensor 12. For example, a capacitance sensor or a pressure sensor may be employed.

Furthermore, while the above exemplary embodiment has been described with reference to the case in which the state of the seat 10 is detected by using the antenna electrodes 17, the antenna electrode 19, and the weight sensors 12, a camera that can capture the image of the surface of the seat 10 may be provided. Thus, the occupant detecting unit 20 may determine the state of the seat 10 (e.g., the type of occupant, the occupant state, the presence/absence of an occupant sitting in the seat, and the presence/absence of a child seat) using the captured image.

Still furthermore, while the above exemplary embodiment has been described with reference to the case in which the antenna electrodes 17 and the antenna electrode 19 are provided in order to detect the state of the seat 10 and determine deployment/non-deployment of the side airbag module 18 and the weight sensor 12 is provided in order to detect the state of the seat 10 and determine deployment/non-deployment of the front airbag module 42, the present invention is not limited to such a configuration. For example, at least one of the weight sensor 12 and a set of the antenna electrodes 17 and the antenna electrode 19 may be provided, and determination of deployment/non-deployment of one of the side airbag module 18 and the front airbag module 42 corresponding to one of the provided antenna electrodes and weight sensor may be made.

Obviously, numerous modifications and variations of the present invention are possible in light of the above teachings. It is therefore to be understood that within the scope of the appended claims, the invention may be practiced otherwise than as specifically described herein.

What is claimed is:

1. An airbag control apparatus of a vehicle, comprising:
   an occupant determination device configured to detect an occupant sitting on a seat in the vehicle, the occupant determination device including at least one antenna electrode and a weight sensor;
   a deployment determination device configured to determine deployment/non-deployment of an airbag based on a detection result of the occupant determination device, the deployment determination device being configured to output a result of determination including one of deployment information and non-deployment information;
   a storage device configured to store deployment/non-deployment information made by the deployment determination device, the deployment/non-deployment information including one of the deployment information and the non-deployment information;
   an airbag controller configured to control deployment of the airbag based on the deployment/non-deployment information; and
   a voltage variation detector configured to detect a variation in a voltage of an in-vehicle battery when the voltage of the in-vehicle battery decreases to a predetermined voltage value and configured to output voltage variation information to the airbag controller, the in-vehicle battery being configured to supply power to the deployment determination device, wherein
   if the voltage variation information indicates that the voltage detected by the voltage variation detector varies, the airbag controller controls the airbag during occurrence of the voltage variation based on the deployment/non-deployment information stored in the storage device immediately before the airbag controller receives the voltage variation information indicating that the voltage detected by voltage variation detector varies,
   if the voltage variation information indicates that the voltage detected by voltage variation detector varies, the airbag controller maintains one of a deployment control and a non-deployment control of the airbag until the deployment/non-deployment information is re-input from the deployment determination device to the airbag controller, and
   the predetermined voltage value comprises a voltage value at which normal detection results from the at least one antenna electrode and the weight sensor cannot be retrieved and at which the occupant determination device is at least partially operable.

2. The airbag control apparatus according to claim 1, wherein
   if a variation in the voltage detected by the voltage variation detector disappears, the deployment determination device outputs one of the deployment information and non-deployment information indicating deployment/non-deployment of the airbag based on the detection result of the occupant determination device to the airbag controller, and
   if a variation in the voltage detected by the voltage variation detector disappears, the airbag controller overwrites the deployment/non-deployment information which is input from the deployment determination device on previous deployment/non-deployment information stored in the storage device.

3. The airbag control apparatus according to claim 1, wherein
   if the voltage variation information indicates that the voltage detected by voltage variation detector varies, the deployment determination device stops determining deployment/non-deployment of the airbag.

4. The airbag control apparatus according to claim 1, wherein
   if the voltage variation information indicates that the voltage detected by voltage variation detector varies, the deployment determination device stops outputting the deployment/non-deployment information including one of the deployment information and the non-deployment information.

5. The airbag control apparatus according to claim 1, wherein
   if the voltage detected by voltage variation detector is lower than a predetermined voltage, the voltage variation detector outputs voltage variation information indicating that the voltage detected by voltage variation detector varies to the airbag controller.

6. The airbag control apparatus according to claim 5, wherein
   the in-vehicle battery of the vehicle is configured to supply power to the occupant determination device, and
   the predetermined voltage is higher than a battery voltage at which the occupant determination device stops detecting the occupant.

7. The airbag control apparatus according to claim 1, wherein
   the vehicle includes an engine and an idle stop controller, and
   the idle stop controller is configured to restart the engine if an automatic restart condition is satisfied when the engine is stopped.

8. The airbag control apparatus according to claim 1, wherein the at least one antenna electrode includes:
   a plurality of first belt-shaped electrodes configured to extend longitudinally across a seat back of the seat; and a second belt-shaped electrode configured to extend vertically along a side of the seat back.

9. The airbag control apparatus according to claim 8, wherein the second belt-shaped electrode is configured to be located on an outer side of the seat back in the width direction of the vehicle.

10. The airbag control apparatus according to claim 9, wherein the second belt-shaped electrode is configured to be disposed so that a height of the second belt-shaped electrode is aligned with a height of a side airbag of the vehicle when inflated.

\* \* \* \* \*